July 24, 1962

E. LOWE ETAL 3,046,143

PROCESS FOR COATING FOOD PRODUCTS

Filed Feb. 15, 1961

2 Sheets-Sheet 1

E. LOWE, E.L. DURKEE
& W.E. HAMILTON
INVENTORS

BY R. Hoffman
ATTORNEY

E. LOWE, E.L. DURKEE
& W.E. HAMILTON
INVENTORS

United States Patent Office 3,046,143
Patented July 24, 1962

3,046,143
PROCESS FOR COATING FOOD PRODUCTS
Edison Lowe, El Cerrito, Everett L. Durkee, El Sobrante, and Walter E. Hamilton, El Cerrito, Calif., assignors to the United States of America as represented by the Secretary of Agriculture
Filed Feb. 15, 1961, Ser. No. 89,589
12 Claims. (Cl. 99—168)
(Granted under Title 35, U.S. Code (1952), sec. 266)

A non-exclusive, irrevocable royalty-free license in the invention herein described, throughout the world for all purposes of the United States Government, with the power to grant sublicenses for such purposes, is hereby granted to the Government of the United States of America.

This invention relates, in general, to the application of protective coatings on food products. More particularly, the invention relates to and has among its objects the provision of novel devices and methods for applying such coatings and for regulating the amount or thickness thereof. Further objects and advantages of the invention will be evident from the following description wherein parts and percentages are by weight unless otherwise specified.

Figure 1:
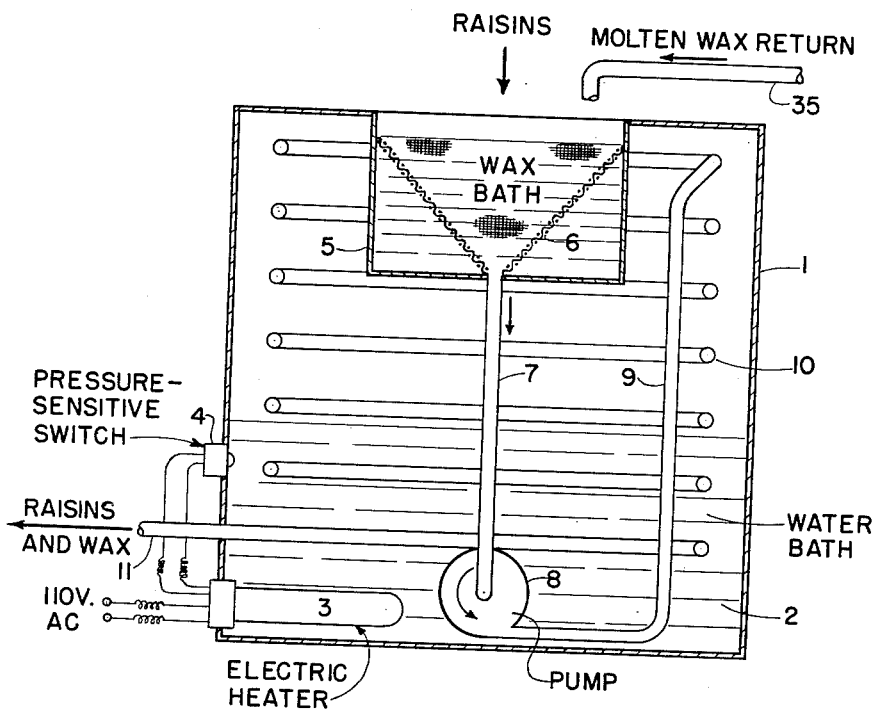
Figure 3:
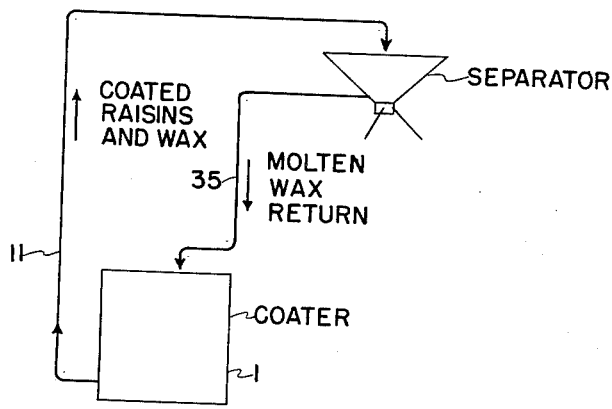
Figure 2:
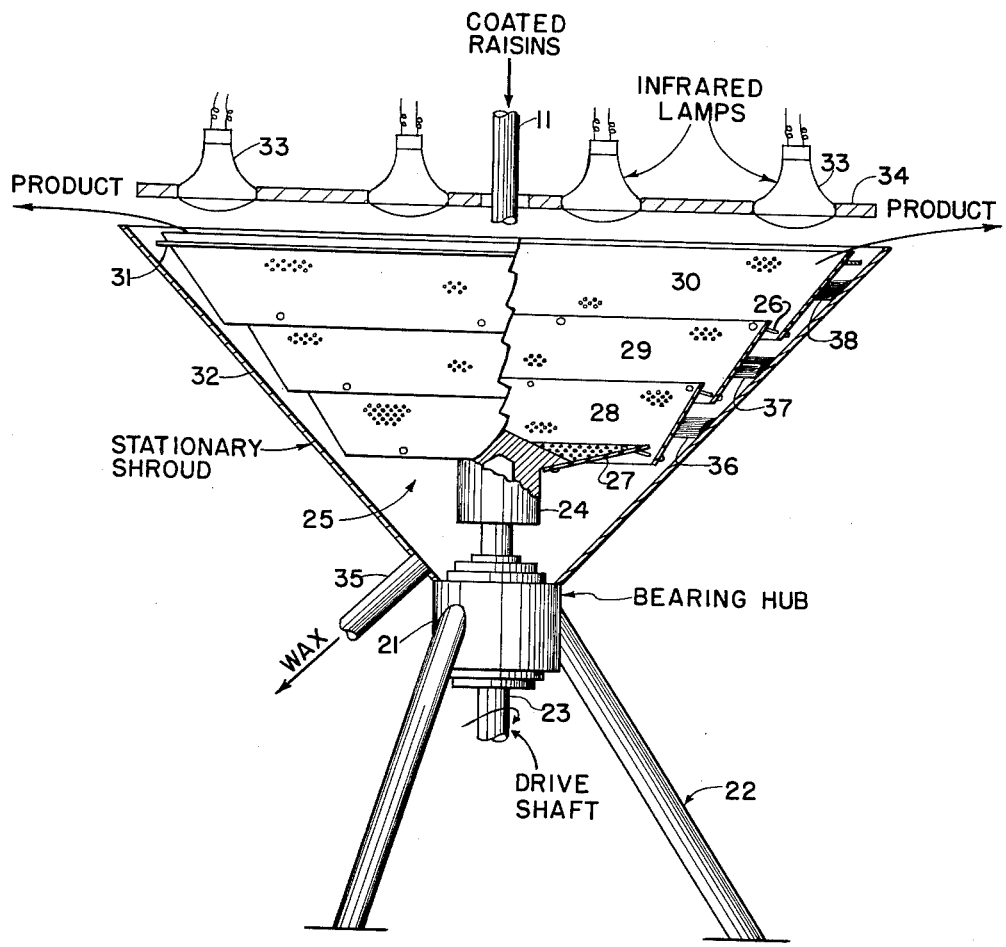

In the annexed drawing: FIGURE 1 depicts a form of apparatus for coating food products in accordance with the invention. FIGURE 2 depicts a form of separator in accordance with the invention. Both FIGURES 1 and 2 are partly in cross-section. FIGURE 3 is a schematic diagram illustrating the connected system of coating and separator devices.

The problems with which the invention is concerned are explained below, having particular reference to raisins. It is to be understood, however, that the invention is not limited to the coating of raisins but is of general applicability to foods of all kinds.

It is well known in the art that food products may be provided with protective coatings. Beeswax is commonly used for this purpose and is advantageously applied to dried fruit, such as raisins, in order to prevent moisture loss or gain by the product during storage. In the Watters and Brekke Patent No. 2,909,435 there is disclosed an improved method for preserving raisins, or the like, by first dusting the fruit with a polysaccharide such as starch and then applying a coating of beeswax.

Generally, raisins are coated by immersing them in molten wax and then draining the fruit to remove excess wax. A major problem encountered in this field is that it is difficult to form sufficiently thin coatings. Instead, the coating is thick and lumpy and often individual raisins are cemented together by the wax. Even under the best known methods the coatings are so thick that they can be seen on the fruit and can be tasted, or, at least the waxy texture of the coating is discernible to the consumer when biting into the fruit, in that the wax sticks to the teeth, producing an unpleasant reaction.

Our researches in this field have demonstrated that several elements contribute to the characteristics of wax coatings on raisins or the like. One element concerns the way in which the wax is initially deposited on the raisins, the other concerns what may be termed the after-treatment, that is, the processing subsequent to application of the wax coating.

Regarding the initial application of the coating, we have found that several factors exert considerable influence on the thickness of the coating formed on the raisins. Included among these factors are the temperature of the wax bath, the condition of the wax bath (that is, whether it is agitated or in a stagnant condition), and time of immersion of the raisins in the wax bath. For example, the wax bath must be kept at sufficiently high temperature—above the boiling point of water, preferably about 250° F.—to facilitate evaporation of surface moisture from the raisins and to prevent a chilling of the wax near the fruit pieces; such a chilling effect produces lumpy coatings of gross thickness. Another point is that if the bath is not agitated, localized chilling will occur, again causing lumpy, grossly-thick coatings and cementing together of individaul raisins. With regard to time of immersion, it has been found that too short immersion periods lead to grossly-thick coatings. By extending the time of immersion, coatings of reasonable thickness are readily obtained. For best results it is preferred to hold the raisins in the molen wax at least long enough (a) to cause the raisins to be heated to a temperature that will prevent chilling of the wax coating as the raisins are removed from the bath and (b) to cause moisture on the surface of the raisins to be evaporated. The proper time for immersion will vary on such factors as the temperature of the wax bath, the original temperature of the raisins, their moisure content, etc. For example, using a wax bath at 250° F. with raisins at room temperature containing about 15% moisture, an immersion time of about ½ minute gives good results. In any particular case, the proper time for immersion can be determined by pilot trials at different periods of time, noting the appearance of the raisins when withdrawn from the bath and selecting a time which provides the raisins with a thin, scarcely visible coating. The apparatus depicted in FIG. 1 and described herein below is adapted to accomplish the coating of raisins under the proper conditions of maintenance of the temperature of the wax bath, agitation of the wax bath, and proper time of immersion of the raisins. Moreover, this apparatus is adapted for continuous operation whereby to obtain efficiency and uniformity of coating.

Regarding the matter of after-treatment, we have found that regardless of how the wax coatings are applied to raisins it is desirable to thin or atenuate the coatings by subsequent treatment. It would be expected that any efficient draining system would be able to rduce the film thickness; however, such is not the case. For example, if the wax-dipped raisins are held on a screen and kept warm enough so that the wax may flow, little if any reduction in coating thickness is obtained even after drainage periods of an hour or more under such conditions. Contributing to the inadequate drainage are such factors as the rough and irregular surface of the raisins, the viscous and sticky nature of molten wax, and the property of the molten wax of greatly increasing in viscosity with decreasing temperature. Also, any wax which does drain from the fruit tends to plug the interstices of the supporting screen so that further drainage becomes impossible. It might be contemplated that more efficient drainage could be attained by using such equipment as centrifuges or vibratory screens. However, extensive investigations carried out by us have shown that this is not the case. For example, wax-dipped raisins were subjected to the action of a centrifuge equipped with a perforated basket and means—such as radiant heaters or hot air blasts—to keep the apparatus and product at a temperature at which the wax would flow. Under the very best conditions a product could be produced wherein the coating was 4% of the weight of the fruit. If further centrifugal action was applied, the raisins were forced into the perforations of the basket or were flattened out of shape. Also, the coatings were non-uniform in that the raisins tended to slide up the sloping walls of the basket without any tumbling action so that their surfaces which faced to center of rotation had thicker coatings than the surfaces which faced outwardly. Experiments were also carried out wherein wax-dipped raisins were subjected to the action of vibratory screens or rotating squirrel-cage screens provided with heating means to keep the product and apparatus at a temperature at which the wax would flow. Here again, inadequate results were obtained. By prolonged treatments of 15 to 30 minutes the coatings could be reduced to a desirable level of about 3% of the weight of the fruit but such prolonged treatments resulted in loss of weight by the fruit (due to dehydration), breakage of the fruit, plugging of the screens, and non-uniformity of coating thickness. Because of the extended time of treatment, it was determined that a vibratory screen arrangement about 10 inches wide and 8 feet long would have a through-put of only 60 pounds of fruit per hour, together with the above-mentioned disadvantages of breakage of fruit, repeated plugging of the screen, and non-uniformity of coating.

In accordance with the present invention, the drainage of the wax-dipped fruit to reduce the coating thickness is attained by a procedure which includes as its vital factor repeated impingement of the fruit on a perforated surface. A form of apparatus for accomplishing this desired result is illustrated in FIG. 2 of the annexed drawing.

Referring now to the annexed drawing, FIG. 1 illustrates a form of coating device which includes a closed tank 1 provided with means for maintaining the interior of the tank at a constant temperature, for example, 250° F. At the base of the tank is a pool of water 2 heated by conventional electric immersion heater 3. A pressure-sensitive switch 4 is provided to control heater 3 whereby the upper part of the tank will be kept filled with steam, for example, at 15 lbs. per sq. in. gauge (250°). By this means the interior of tank 1 and all the structure therein are kept at a proper temperature for the wax coating operation. A conventional purge valve (not illustrated) may be provided at the top of tank 1 to bleed off air when the apparatus is started up. The exterior of tank 1 may be covered with conventional thermal insulation to prevent heat loss.

Postioned within tank 1 is a vessel 5 which acts as a reservoir for molten wax. Within vessel 5 is a cone 6 of screening which directs raisins toward the pipe 7. Near the base of tank 1 is a conventional centrifugal pump 8 driven by a shaft which protrudes out of the side of the tank.

In operation, the raisins to be coated are continuously fed into vessel 5. Pump 8 sucks the raisins and wax through pipe 7 and discharges them into pipe 9. From there the mixture of raisins and wax is forced through the spiral coil of pipe 10 and out of the system through conduit 11. It is evident that since the wax bath, the pump, and all the piping are within the heated tank 1, the wax is continuously maintained at the proper temperature for producing a good coating. Also, by pumping the raisins and wax through the circuitous pipe system 10, there is continuous agitation of the molten wax so that localized chilling is avoided and, moreover, the raisins remain in intimate contact with the hot wax long enough to ensure an adequate heating of the raisins and evaporation of surface moisture thereon whereby to avoid lumpy deposits of wax. It may also be noted that if surface moisture were permitted to remain on the fruit, it would prevent the wax coating from adhering properly so that the resulting coating would be imperfect as a vapor barrier. By evaporating surface moisture, a tightly adherent coating is obtained which properly protects the raisins from moisture loss or gain during subsequent storage.

From the coating device, the stream of raisins and molten wax is directed by pipe 11 (see FIG. 3) to the separator device (FIG. 2). The stream of wax and raisins may be directly fed to the separator, as shown, or one may interpose a gross separator, such as a screen arrangement, at the discharge end of pipe 11 so that most of the wax is separated and directly returned to the coating device, whereas the raisins and any residual wax are fed into the separator device.

Referring to FIG. 2, the separator apparatus includes a bearing hub 21 supported by tripod support legs 22. Journalled in bearing hub 21 is a drive shaft 23 rotated by conventional means such as a variable-speed electric motor (not illustrated). Keyed to drive shaft 23 is a spinner hub 24 which carries a stepped basket, generally designated at 25. This basket is made up of four sections of perforated metal, each of conical shape (27, 28, 29, 30) and secured to one another by bolts 26 so that the entire assembly rotates with spinner hub 24. Special attention is called to the fact that the cone sections (27, 28, 29, 30) do not form a continuous surface but are arranged in a series of steps. As evident in the figure (right hand side), there is a gap between the top of each cone and the surface of the next higher cone. This step-wise arrangement, as will be explained hereinafter, is essential to obtain the desired impact effect. The topmost cone 30 is provided with an external drip-lip 31 which assists in outwardly projecting drained wax as the assembly rotates. A conical shroud 32 is provided about the basket 25 for receiving wax drained from the material treated in the device. Wax collecting in the interior of shroud 32 may be removed by pipe 35. A series of infra-red lamps 33 are positioned through lid 34 to direct radiant heat to the basket 25 and to the material to keep both warm enough so that the wax can flow.

In operating the device, the basket 25 is set into rotation. The stream of raisins and wax is continuously fed into the system via pipe 11 and dropped onto the top of spinner hub 24. Due to centrifugal force, the raisins move outwardly along the surface of cone 27 and are then projected against cone 28. The raisins move outwardly along the surface of this cone and are then projected against cone 29. The same action occurs again as the raisins move outwardly along the surface of cone 29 and are projected against cone 30. Finally, the raisins are propelled out of the device, over the top edge of shroud 32. The raisins leaving the system may be received in an annular trough positioned about the top of shroud 32, or in another suitable receiver. The excess wax contained in the original stream entering through pipe 11 and the wax removed from the coating on the raisins passes through the perforations in the cones and passes through pipe 35 back to the coating device (see FIG. 3).

It is to be particularly noted that the raisins are subjected to three distinct impact or impingement treatments. This is because of the stepped arrangement of the basket 25. The raisins cannot simply roll or slide up the surface of the basket as with a conventional perforated basket centrifuge but are projected through air each time as they bridge the gaps between the four cone sections. It is this impact or impingement which is a prime factor in the efficiency of the present system. Each time that the impact occurs, excess wax coating is hurled away from the raisins and passes through the perforations of the cone section on which the raisin lands. That such impact is a critical factor in thinning of the wax coating on the fruit is evident from an inspection of the machine after it was operated under such conditions that shroud 32 was allowed to cool below the melting point of the wax and the feed was wax-dipped raisins, as such, not in a stream of molten wax. It was observed that wax removed from the fruit pieces collected mainly in the form of three rings about the inside of shroud 32. These rings, designated as 36, 37, and 38 in the drawing, correspond to the positions where the raisins are projected from one cone onto the next. It may be noted that in bridging the gaps between cones, the trajectory of the raisins has an upward component as well as a horizontal one so that the position of landing is displaced somewhat above the horizontal extension of the top edge of each cone.

By utilizing a series of impacts as described above, one is assured of a uniform thinning of the wax coating because of the different orientation of the raisins in each cone section. Thus a second feature of the stepped basket arrangement is that it causes a tumbling of the raisins as they are projected from one cone to another. This eliminates the sliding effect with constant orientation of the raisins observed with conventional perforated basket centrifuges. The net effect of the present system is that the coating on the raisins is not only thinned or attenuated to the desired level, but that this effect is accomplished with uniformity over the surface of the fruit.

It is generally desirable in commercial wax coating of raisins that the proportion of wax on the fruit be somewhat less than 3%, usually about 2 to 2.5% of the weight of the fruit. At such levels the coating is not visible and does not detract from the natural taste or texture of the fruit. Also, at such levels there is a substantial saving in the amount of wax used. By application of the stepped-basket separator of the invention, the coating on wax-dipped raisins can be very readily reduced to such levels and indeed in a very brief time, that is, a fraction of a second. Thus, a particular advantage of our separator is that it not only attains the desired thinning of the wax coating but it accomplishes such action very rapidly. Such rapid action, of course, means that the apparatus has not only a high through-put of material but that it completely avoids any possibility of the fruit being dehydrated during the process. Another advantage is that the fruit is not damaged during the treatment, there is no flattening of the pieces, nor any breakage or rupturing of the pieces. Also, the treated fruit pieces have a uniformity of coating thickness. The efficiency of the system is demonstrated by the fact that an apparatus as described above wherein the maximum diameter of the topmost cone is 23½ inches and the basket is driven at 300 r.p.m., will receive raisins having an initial coating of 12% and yield raisins with a coating level of 1.7 to 2.0% at a through-put of 500 to 1,000 lbs. per hour.

Another advantage of the present invention is that it enables the formation of desirable thin coatings without the use of solvents. Thus, it has been advocated that thinner coatings can be attained by applying to the product a solution of wax in a volatile organic solvent. Such solutions, because of their lower viscosity, will readily form thin coatings. However, there is a grave disadvantage in the use of a solvent in that it may extract valuable nutrients and natural pigments from the food product being coated and also it is very difficult to ensure complete removal of residual solvent from the coated product. Another disadvantage of the use of a solvent is that the resulting coatings are not resistant to vapors and raisins so coated will exhibit moisture loss on storage in a dry atmosphere. The present invention completely obviates these disadvantages stemming from the use of solvents.

Although it is preferred to utilize a system including both the coating apparatus and the separator apparatus as described above, it is within the ambit of the invention to utilize the disclosed coating apparatus, for example, with other separator means or to use a different coating apparatus and then reduce the thickness of the coating with the separator apparatus of FIG. 2. Thus for example in batch operations, raisins may be simply dipped in molten wax, drained on a screen, and then treated with the separator device of FIG. 2 whereby to obtain raisins covered with a desirably thin wax coating. Such a system is demonstrated in the illustrative example, below.

In the device illustrated in FIG. 2 the cone sections 27, 28, 29, and 30 are arranged so that the angles they subtend with the vertical plane are successively decreased. This is done so that the raisins will remain on each cone section for approximately the same period. The difference in angle obviously compensates for the difference from the radius, hence difference of peripheral speed. This arrangement of the device is, however, not critical and any arrangement of conical, stepped sections will provide the desired impact.

Generally, in treating raisins the speed of rotation of the stepped basket and the size thereof are so selected that the raisins are impacted from one section to the next with a force of at least six times gravity (hereinafter abbreviated "g"), preferably about 10 to 25 g. It is obvious that higher forces may be used short of those which cause a flattening or rupture of the fruit pieces. It is also evident that in treating other food products the force of impact may be adjusted, as by varying the speed of the stepped basket or the number of steps in the basket, to achieve a desired degree of thinning of the original coating without product damage. Products of tough texture may obviously be subjected to higher impact forces than softer or more fragile products. In the latter case, impacts of lesser force may be applied more times by using more sections in the stepped basket to achieve the desired attenuation of the original coating.

In the preferred modification of the apparatus of FIG. 2, infra-red heat lamps are provided to maintain the device warm enough so that the expelled wax will be capable of flowing. It is evident, however, that other heating means such as hot air blasts, hot water jackets, or the like may be used. Also in this connection, pipes 11 and 35 may be provided with thermal insulation or with conventional heating jackets to prevent chilling of the molten wax in its passage through these pipes.

It is evident that the perforations in the cone sections of the stepped basket should be small enough that the raisins will not pass through the perforations or become keyed therein. However, the perforations should be large enough to permit free passage of wax and fruit debris. Generally, it is preferred that the upper cones (28, 29, 30) have circular perforations 0.04" to ¹⁄₁₆" in diameter, whereas the lowest cone (27) has larger circular perforations—³⁄₁₆" in diameter. It is evident that in handling of products other than raisins, the perforations in the cone sections may be sized in accordance with the material in question, bearing in mind the above principles.

Although the invention is of particular advantage in treating raisins, it is not limited to this commodity but may be applied to all kinds of food products. Typical examples of food products to which the invention may be applied are figs; dates; prunes; dried cherries; dried apricots; candied fruit such as candied citron; nuts; meats in piece form; pellets or tablets of compressed dried food such as dried eggs, dried milk, dried soup, dried fruit juices; candies and confections, etc.

Moreover, although the invention is of particular advantage in coating foods with beeswax, it is evident that the invention may be applied to other coating materials, particularly those which are normally solids and which are viscous when melted so that they form thick coatings on dipping the food articles therein. Thus for example, the coating material may be carnauba wax; candelilla wax; spermaceti; paraffin; edible fats; hydrogenated fats or oils; etc. These materials may be used singly or in admixture. Thus for example, a relatively brittle wax may be admixed with a fat, lecithin, or other plasticizer to obtain a more flexible film coating.

The invention is further demonstrated by the following illustrative example:

Example

Raisins were dipped for ½ minute in a bath of molten beeswax maintained at 250° F. The raisins were removed from the beeswax and drained on a screen for a few seconds. The raisins were coated with a film of beeswax which constituted about 12% of the weight of the fruit.

The wax-dipped raisins were then treated in the device as described in FIG. 2 to reduce the thickness of the wax coating. The cones had the following diameters (measured at the top of each):

| | In. |
|---|---|
| Cone 30 | 23.5 |
| Cone 29 | 19 |
| Cone 28 | 14 |
| Cone 27 | 11 |

Temperature of the cones was 200° F.

Three runs were made at different speeds (240, 270, and 300 r.p.m.) and the proportion of coating on the raisins was then determined. In run 3 (300 r.p.m.) it was calculated that the centrifugal forces at the upper peripheries of cone sections 27, 28, and 29 were 13.8, 17.9, and 24.3 g. respectively. The results are tabulated below:

| Run | Rotational speed, r.p.m. | Wax content of treated raisins, percent |
|---|---|---|
| 1 | 240 | 2.08 |
| 2 | 270 | 2.10 |
| 3 | 300 | 2.01 |

The through-put of raisins was 350–500 lbs./hr.

Having thus described the invention, what is claimed is:

1. A process for coating foods which comprises immersing solid food particles into a turbulent bath of a hot, molten, normally-solid coating material, holding the food particles immersed in said bath until surface moisture on the particles has been evaporated, and then removing the food particles from the said bath.

2. A process for coating foods which comprises immersing solid food particles in a turbulent bath of hot, molten wax, holding the particles immersed in said bath until they are heated to a temperature sufficiently high to prevent chilling of the surface wax when the particles leave the bath and until surface moisture on them has been evaporated and then removing the wax-coated particles from said bath.

3. A process for coating foods which comprises forcing a stream of hot, molten, normally-solid coating material and food particles along an extended path of limited cross-section under turbulent flow conditions and separating the coated food particles from excess coating material.

4. A process for coating raisins which comprises forcing a stream of hot, molten wax and raisins along an extended path of limited cross-section under turbulent flow conditions and separating the wax-coated raisins from excess wax.

5. A process for coating raisins which comprises pumping a stream of raisins and hot, molten wax through an elongated conduit of restricted cross-section under turbulent flow conditions to ensure intimate contact between the raisins and the wax, continuing such action until surface moisture on the raisins has been evaporated, and separating the coated raisins from excess wax.

6. A process for coating raisins which comprises pumping a stream of raisins and hot, molten wax through a treatment zone maintained at about 250° F. under turbulent flow conditions to ensure intimate contact between the raisins and the wax, and separating the coated raisins from excess wax.

7. A continuous process for coating food particles which comprises continuously feeding food particles into a stream of hot, molten coating material, continuously pumping the stream of coating material and food particles through an elongated treatment zone of restricted cross-section under turbulent flow conditions to ensure intimate contact between the coating material and the food particles, continuously feeding the coated particles and coating material to a separation zone, continuously separating the coated food particles from excess coating material, and continuously recycling the excess coating material to said first-mentioned stream.

8. A process for coating foods which comprises dipping solid food particles into a bath of a molten, normally-solid coating material and then thinning the coating on the food particles by impinging them against a perforated surface with a force sufficient to dislodge some of the coating material but insufficient to damage the food particles and applying heat to the food particles during the said impingement to keep the coating material in a fluent condition.

9. A process for coating raisins which comprises dipping raisins into a bath of molten wax and then thinning the coating on the raisins by impinging the wax-dipped raisins against a perforated surface with a force sufficient to dislodge some of the wax but insufficient to damage the raisins and applying heat to the raisins during said impingement to keep the wax in a fluent condition.

10. A process for coating raisins which comprises dipping raisins into a bath of molten wax and then thinning the coating on the raisins by impinging the wax-dipped raisins by centrifugal action against a perforated surface with a force of at least six g, sufficient to dislodge some of the wax but insufficient to damage the raisins and applying heat to the raisins during said impingement to keep the wax in a fluent condition.

11. A process for preparing wax-coated raisins which comprises providing raisins having an excessive wax coating and thining the coating on the raisins by repeatedly impinging the wax-coated raisins against a perforated surface with a force sufficient to dislodge some of the wax but insufficient to damage the raisins and simultaneously applying heat to the raisins during said impingement to keep the wax in a flowable condition.

12. A process for coating raisins which comprises dipping raisins into a bath of molten wax to provide the raisins with a wax coating of more than 3% of the weight of the fruit, then attenuating the coating on the raisins by subjecting the wax-dipped raisins to centrifugal action with repeated impact of the raisins against a perforated surface with a force of at least six g, sufficient to dislodge some of the wax but insufficient to damage the raisins and simultaneously applying heat to the raisins to keep the wax in a fluent condition, the application of said centrifugal action, impacting, and heating being continued until the coating on the raisins is reduced to about 2 to 2.5% of the weight of the fruit.

References Cited in the file of this patent

UNITED STATES PATENTS

| | | |
|---|---|---|
| 1,840,289 | Hunter | Jan. 5, 1932 |
| 1,900,295 | McDill | May 7, 1933 |
| 2,652,805 | D'Angelo | Sept. 22, 1953 |
| 2,909,435 | Watters | Oct. 20, 1959 |
| 2,971,849 | Keil | Feb. 14, 1961 |